United States Patent [19]

Kakida et al.

[11] Patent Number: 5,577,597
[45] Date of Patent: Nov. 26, 1996

[54] WORK TRANSPORT SYSTEM INCLUDING PALLET TRANSPORT APPARATUS

[75] Inventors: Takuya Kakida; Akitoshi Fujiwara, both of Okayama-ken, Japan

[73] Assignee: Mitsubishi Jidosha Kogyo Kabushiki Kaisha, Tokyo, Japan

[21] Appl. No.: 384,637

[22] Filed: Feb. 6, 1995

Related U.S. Application Data

[63] Continuation of Ser. No. 72,630, Jun. 4, 1993, abandoned.

[30] Foreign Application Priority Data

Jun. 5, 1992 [JP] Japan .................. 4-171933

[51] Int. Cl.$^6$ .................................. B65G 29/00
[52] U.S. Cl. ............... 198/465.1; 198/346.2
[58] Field of Search .............. 198/465.1, 465.3, 198/468.6, 744, 346.2; 414/392, 393, 416, 528, 609; 29/430, 469, 711, 771, 783, 784, 791, 793, 799, 824

[56] References Cited

U.S. PATENT DOCUMENTS

| | | | |
|---|---|---|---|
| 3,559,831 | 2/1971 | Weston | 414/528 |
| 4,306,646 | 12/1981 | Magni | 198/346.2 |
| 4,411,354 | 10/1983 | Thibault et al. | 198/465.1 |
| 4,476,973 | 10/1984 | Kessler et al. | 198/744 |
| 4,667,866 | 5/1987 | Tobita et al. | |
| 4,738,022 | 4/1988 | Sakamoto et al. | 29/430 |
| 4,813,529 | 3/1989 | Kawai et al. | 198/468.6 |
| 4,981,252 | 1/1991 | Yazaki et al. | |
| 5,191,958 | 3/1993 | Tolocko | 198/346.2 |

FOREIGN PATENT DOCUMENTS

| | | |
|---|---|---|
| 446518A | 9/1990 | European Pat. Off. . |
| 2556975 | 12/1975 | Germany . |
| 3608217 | 9/1987 | Germany . |
| 62-136401 | 12/1985 | Japan . |
| 62-225474 | 3/1987 | Japan . |
| 2250276 | 3/1992 | United Kingdom . |

*Primary Examiner*—Joseph E. Valenza
*Attorney, Agent, or Firm*—Keck, Mahin & Cate

[57] ABSTRACT

A work transport system including pallet handling device for moving works from a loading dock area to a production line of a plant. The pallet handling device includes a pallet delivery route and a pallet collection route. The system includes the pallet handling device, a work loading device, a conveyor, and a work unloading device.

4 Claims, 10 Drawing Sheets

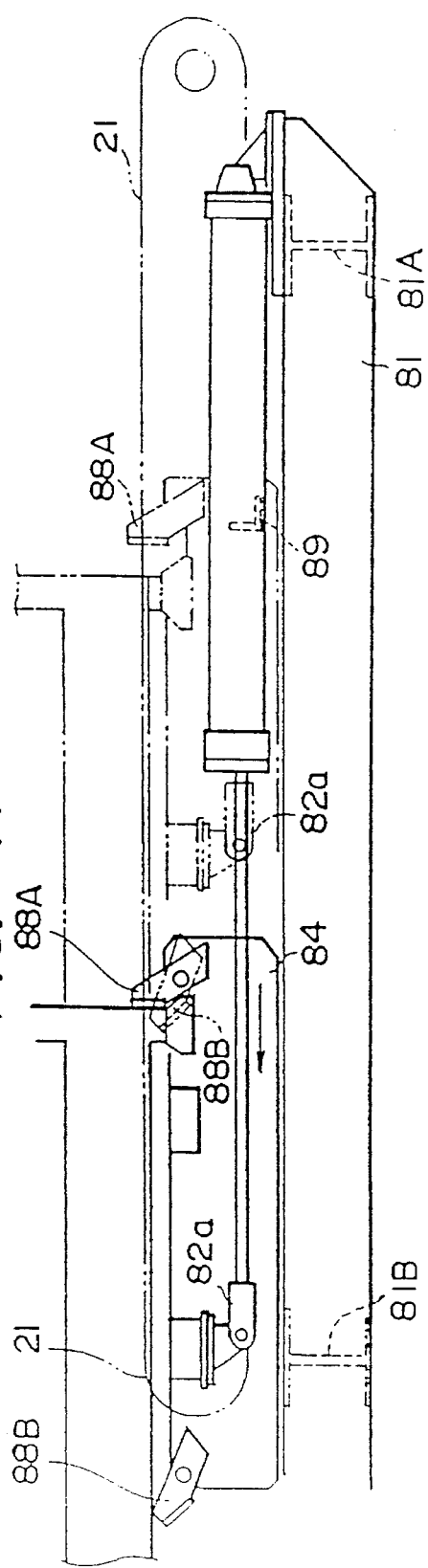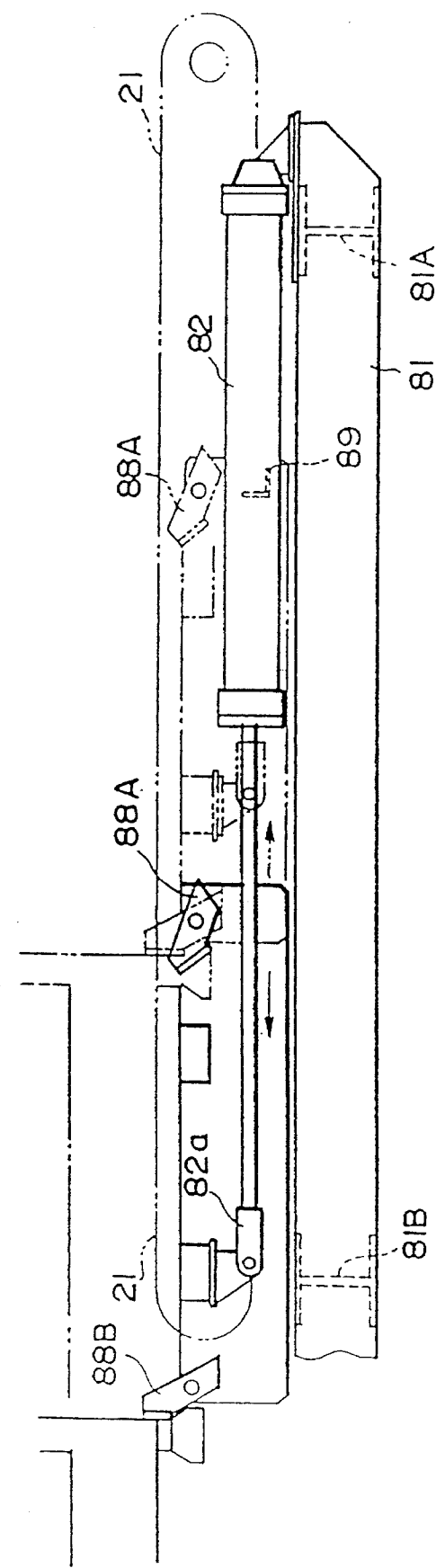

15,577,597

WORK TRANSPORT SYSTEM INCLUDING PALLET TRANSPORT APPARATUS

This is a continuation of application Ser. No. 08/072,630, filed Jun. 4, 1993 now abandoned.

FIELD OF THE INVENTION

This invention relates to a work transport system for automotive components or other production line components which are loaded on pallets. More specifically, it concerns a work transport system for automotive components which is designed to transport large automotive parts such as exterior body panels. This work is loaded on pallets and transported from their point of entry, such as from the bed of a truck to the vicinity of an assembly line.

BACKGROUND OF THE INVENTION

In the assembly process for automobile bodies and frames currently is use, various pressed (i.e., stamped) work related to parts of the frame such as the axle housing or the side rails are produced in lots by an outside firm or subcontractor. This work includes the exterior body panels, such as the roof panel, the outer door panels and the side panels for the body, and the interior body panels such as the floor pan and the interior door panels. Once these panels are pressed, each type is loaded onto its own special pallet. A truck or some similar conveyance is used to transport the pallets into the plant where the body welding and assembly line is located. There they are stacked temporarily until such time as they are needed. One of these pallets is then transported to a specified location on the line by a forklift or by a self-propelled driverless truck guided either by remote control or by cable, as disclosed in Japanese Patent Publication (Kokai-Kohou) Heisei 1-172078. A worker or robot then removes the desired work from the pallet as needed for welding or assembly.

With the production system described above, pallets on which numerous pieces of the required work are loaded and delivered to desired locations on both sides of the welding and assembly line. To supply pallets to the vicinity of the line, one must ensure that there is enough room near the line to accommodate the pallets. In recent years, the multiple mixed flow line on which the same line can accommodate a number of different models of car, has come to be widely used. For this type of line, a number of pallets of work for each model of car must be available near the line. Since this requires the use of space which serves no purpose at a given moment, it is not desirable from the point of view of production efficiency.

Moreover, as press (i.e., stamping) equipment has advanced in recent years, individual pieces of work have been made larger so as to reduce the number of welding and assembly processes on the assembly line. As a result, the size of the pallets themselves has increased proportionately, which frequently causes them to stick out into the passageways parallel to the line. From the point of view of safety, this is not a suitable situation.

To solve these problems, a system was devised whereby multiple pathways were provided in the body panel supply line so that it would be possible to supply the type of panel needed selectively. This system was disclosed in Japanese Patent Publication (Kokai-Kohou) Heisei 2-358, corresponding to U.S. Pat. No. 4,981,252.

However, this technology was unable to solve the problem of dead space required in the vicinity of the assembly line as described above.

SUMMARY OF THE INVENTION

In light of these defects in the existing technology, the main object of the present invention is to provide a work transport system for automotive parts or other assembly line parts, which can eliminate as much dead space as possible around the production line and provide efficient use of the surrounding space, and be acceptable in terms of both production efficiency and safety.

Another object of the present invention is to provide a work transport system which will allow large automotive components such as exterior body panels to be transported directly from the point of entry of the pallets, for example from part delivery vehicles, to the production line.

A further object of the present invention is to provide a work transport system for automotive components including a pallet transport device capable of both stocking work at the entry to the plant and recirculating pallets. Such a system can readily achieve the previously mentioned object even on a multiple mixed flow line such as a line producing various models of automobiles.

An even further object of the present invention is to provide a pallet transport device ideally suited for use in the aforementioned work transport system for automotive components or other assembly line components.

A still further object of the present invention is to provide a pallet transport device which can convey and recover the aforementioned pallets efficiently in a limited space.

Yet another object of the present invention is to provide a loading device which can transfer the work smoothly from a pallet on the aforesaid pallet transport device to the side of the production line.

The present invention is distinguished by the following features. It concerns transporting and handling, in particular, large pieces such as the side panels of an automotive body. A pallet transport device which is distant from but within the same building as the production line carries a pallet on which are loaded one or more pieces of work. The pallet transport device includes a loading device located at the truck loading dock. In the vicinity of the point of entry of the pallets (i.e., the truck loading dock) is located a stock area for pallets loaded with work, also referred to as a work storage area. The stock area and the assembly positions on the production line are connected by a closed circulation route for transporting work. The work is removed in an orderly fashion from a pallet temporarily stored in the aforesaid stock area, and one or more pieces of work are then delivered to the side of the production line which may be a welding or assembly line (i.e., to the vicinity of a welding station or other work station on an assembly line).

The present invention dispenses with the need for a pallet loaded with work to be placed in the vicinity of the production line. Pallets of work remain in the stock area located next to the point of entry, while the appropriate work for the car being built is transported from the stock area to the proper side of the production line. This system obviates the need to maintain a space next to the production line sufficient to accommodate one or more pallets. It allows a single work or the required number of pieces of work to be delivered to the desired working position, for example to a welding station, as needed. It thus confers benefits both in terms of safety and in production efficiency.

Furthermore, the aforesaid work is transported on the conveyor one piece at a time. There is thus no need to stack the work vertically near the production line, as would be the case were it loaded on a conventional pallet. It may be laid flat on the conveyor according to the shape of the work. This means that there is no need for excessive vertical clearance above the conveyor route. An efficiency is gained in lowering the clearance required, and the danger of damage by impact is lessened when the work is transported singly as opposed to being stacked on pallets, contributing to an improvement in quality.

The technology described above obviates the need for a forklift to transport pallets within the plant. This greatly reduces the incidence of forklift collisions. With the exception of the main passageway, it is no longer necessary to provide forklift routes with guaranteed clearance, and the workplace is made cleaner and quieter.

When adapted for production lines making a variety of car models, the work transport system has a number of work transport devices or pallet handling devices (i.e., an array) lined up along the conveyor route providing work for various automobile models. The appropriate work for different models can be removed selectively from the stock areas of the array of work transport devices. Even in the case of a multiple mixed flow line, work for the different models can be selectively removed from the appropriate work transport device and transported to the production line. Thus, there is no need to keep numerous work or pallets for every model close to the production line. The space around the line can be used more efficiently, and there is no danger that pallets will protrude into the passageways near the production line.

Work can be transported directly to welding or other work stations on the production line. A conveyor is used to move the work along the conveyor route to the work stations. The conveyor unloads the work from the aforesaid conveyor route and deposits it next to the appropriate work station.

In the conventional system, there is a route along which pallets loaded with work at the point of entry are transported from the truck loading platform to a stock area. If there is no collection route for empty pallets to be returned to the truck loading dock once all the work has been removed from the pallets at the production line, there is no possibility of a continuous supply of work. In attempting to provide a continuous supply of work with the conventional system, if a collection route is set up parallel to the aforesaid delivery route, a great deal of space is required. In particular, multiple mixed flow production lines require a number of delivery and collection routes equal to the number of specialized pallets (i.e., equal to the number of automotive models of cars being built on that line), thus requiring a tremendous amount of space to implement such a system.

In the present invention, a delivery route is provided along which full pallets are transported from the truck loading dock to the stock area by the work transport device. A pallet collection route is also provided from which empty pallets are transported from the stock area to the truck loading dock by the work transport device. Preferably, the pallet collection route is located in a space underneath the delivery route.

In a preferred embodiment, the work transport device transports empty pallets, after removal of the work within the stock area, by lowering the empty pallets with an elevator along the pallet collection route. The empty pallets can then be collected by the truck delivery vehicle from the aforesaid truck loading dock via the aforesaid collection route.

The delivery and collection routes, one on top of the other, provide a single continuous pathway. This saves a great deal of space and allows the pallets to be recirculated smoothly.

The structural elements used in the aforesaid work transport system will now be described.

A pallet transport vehicle such as a truck or forklift delivers full pallets of work to the truck loading dock. A drive conveyor of the pallet transport vehicle unloads full pallets of work from the pallet transport vehicle to the work transport device at the loading dock.

A lifting device (i.e., an elevator) with a drive conveyor can be provided at the loading dock at a level of the pallet transport vehicle. The drive conveyor of the lifting device can then be selectively raised and lowered to the levels of the aforesaid delivery and collection routes and to the loading level of the pallet transport vehicle.

A control mechanism can be provided to drive or stop driving the lifting device to the level of either the delivery route or collection route. A pallet pushing device can be provided on an intermediate transport device positioned adjacent the lifting device to push the pallet into a given position in the stock area.

The pallet pushing device employs a hydraulic cylinder which is oriented parallel to the direction in which the pallet moves. By extending the rod of the hydraulic cylinder, the aforesaid device can push a pallet beyond the delivery range of a conveyor not provided with the additional pallet pushing device.

The use of a hydraulic cylinder guarantees an accurate stroke, so the rod can be pushed accurately to the specified position. This allows the work to be removed for the next process accurately and smoothly.

However, in a hydraulic system the rod within the cylinder is extended by means of hydraulic pressure to achieve a specified stroke. Thus, the overall length of the hydraulic actuator must be at least twice the length of the rod. In order to save space, a latch mechanism is utilized in combination with two cycles of operation of the hydraulic cylinder in order to achieve the full length of the pushing distance.

Specifically, the pallet pushing device of this invention includes a hydraulic cylinder with a stroke to extend a rod which is shorter than the range of the pushing distance. It has a latch support connected either directly or indirectly to the cylinder rod. A pair of latches are provided on the latch support with one located on the front of the latch support and the other located on the rear of the latch support in the direction in which the rod extends. The latches are set apart a predetermined distance less than the stroke length of the rod.

The rod in the hydraulic cylinder is moved back and forth repeatedly. This causes the latches on the rear side and the front side to sequentially engage with the pallet one after the other during the two cycles of operation of the hydraulic cylinder so that they can push the pallet fully into the stock area.

When the latches are positioned in an activated vertical orientation, the latches can engage with the rear end of the pallet for pushing the pallet. The latches can be pivotally supported on the latch support so that they rotate under their own weight when the pallet bottom is moved off the latches prior to and during the pushing operation. Alternatively, the latches can be biased mounted and connected to the latch support in a manner that they raise to a vertical orientation again when the pallet bottom is moved off the latches.

The stroke length of the rod is referred to as L and the predetermined distance between said latches is referred to as S. When the rod in the hydraulic cylinder makes its first extension, the rear pushing latch is already engaged with the back of the pallet. When the rod extends, the pallet will be moved over a distance whose length L corresponds to the stroke length of the rod. When the rod is withdrawn, the forward pushing latch engages with the back of the pallet. When the rod makes its second extension, the pallet will be moved over a distance corresponding to the sum of S+L.

The value chosen for S should be as large as possible with the limitation that L>S. This will result in the pallet being moved over a distance of almost 2L, and it will allow the pallet to be fully pushed into the stock area.

With this invention, it is necessary that the pallet loaded with work be placed accurately in the stock area. Further, the pallet delivery route interfaces with the pallet collection route at the lifting device in the stock area, thus, requiring a special arrangement. As it is necessary for both routes to be serviced independently and smoothly, the actual physical layout of the system is as follows.

At the stock area, a plurality of supporting arms provided with conveying rollers are provided to support the underside of the pallet in the stock area. Further, a lifting device is provide for lowering the empty pallet once all the work has been removed from the pallet to begin its path on the pallet collection route. The supporting arms are connected to a mechanism for withdrawing the supporting arms to positions out of the path of movement of the lifting device.

It is desirable to place supporting arms on both sides of the lifting device which lowers the pallet to the specified position while supporting it from the bottom. These supporting arms should be made in such a way that they can be withdrawn from the space in which the lifting device moves up and down. When a pallet is moved into the stock work area, both the supporting arms and lifting device are used to support the full incoming pallet.

After the work has been removed piece by piece from the pallet and the pallet is now empty, the supporting arms are withdrawn from beneath the pallet while the lifting device supports the pallet from underneath. The supporting arms are further withdrawn until they are not blocking the path of movement of the lifting device. The lifting device then lowers the emptied pallet along the pallet collection route.

With this invention, the work must be moved from the stock area to the circulation route of the conveyor, and from the loading point on the conveyor to the production line. A work loading device is used for removing work from the pallet and transporting the same to the conveyor. The work loading device includes a travelling car moving on a set of rails extending between the stock area and the conveyor. The work loading device includes pivoting arms with clamps for grasping the work from the pallet. The pivoting arm can grab a work positioned in a vertical standing position in the pallet and then be pivoted placing the work in a horizontal orientation for loading onto the conveyor. Further, the work loading device is configured to move the pivoting arms with clamps upwardly and downwardly for maneuvering the work from the pallet to the conveyor.

Again, this allows work which is originally stacked in a vertical standing orientation to be placed in a horizontal orientation. This sort of process allows the work to be placed in an optimal position for conveyance to the conveyor.

When the work loading device is used in a work transport system on a production line building a number of different models, a number of different pallet handling devices corresponding to the number of different models are lined up along the circulation route of the conveyor. A set of rails is provided along the line of pallet handling devices for moving the work loading device selectively between pallet handling devices. The rail allows the work loading device to align with any of the entry points of the pallet handling device on the circulation route of the conveyor.

If welding is to be performed by a robot at a welding station next to the production line, the work must be transported with extremely high accuracy.

In a case such as this, it would be desirable to provide a work unloading device at a work station. The work unloading device can include a body or frame which travels on rails between the location where the work is delivered from the conveyor to the work unloading device and its destination on the production lined. Pivoting arms with clamps are provided on the travelling body along with a device for raising and lowering the clamps. A lock is provided at each end of the rails to insure that the travelling body remains in the correct position when loading and unloading. When the wheels of the travelling body are locked by the locks, the travelling body must align with one or more vertical guides located at a work station of the production line. If the travelling body aligns with the guide(s), the pivoting arms with clamps can be lowered from the travelling body to a loading position at the work station.

BRIEF DESCRIPTION OF THE DRAWINGS

FIGS. 6A and 6B are two side views of the pallet pushing device, as shown in FIG. 5;

DETAILED DESCRIPTION OF THE PREFERRED EMBODIMENT

A detail description of the work transport system for automotive pieces of work or other production line work according to the present invention is as follows.

Figure 1:
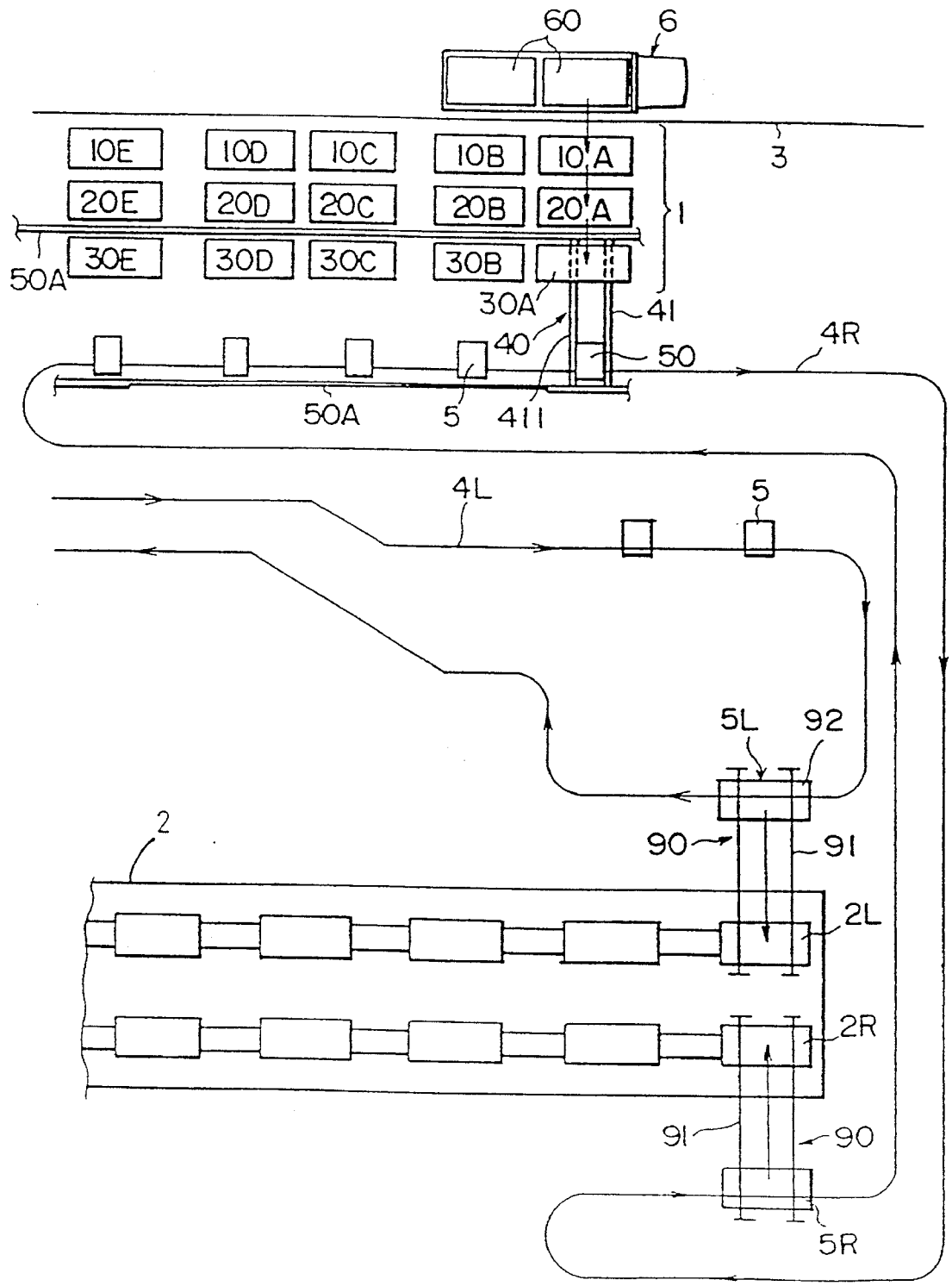
FIG. 1 illustrates the layout of two transport routes for automotive pieces of work to both sides of a production line having welding and assembly work stations on which a number of different automotive models can be built and illustrates an example of how this invention might be implemented.

In FIG. 1, the layout for a transport system for conveying exterior side panels of automobiles in a plant is illustrated. This production line includes welding and assembly work stations, and is configured to allow a number of different car models to be selectively built. This transport system is an example of how the present invention might be implemented.

A pallet handling device 1 positioned at a loading dock area is provided for receiving full pallets of automotive components. The pallet handling device is preferably located next to the entry to the plant with a road running alongside it. The loading dock area can be provided with an array of five (5) pallet handling devices 10A to 30A, 10B to 30B, 10C to 30C, 10D to 30D and 10E to 30E (hereafter generically referred to as pallet handling device 1).

Five groups of different exterior side panels 71 (See FIG. 2) for each of the five different models being built on the welding and assembly line 2 are supplied selectively by the five pallet handling devices 1. The pallet groups in loading dock 1 contain both left and right exterior panels 71, however, to keep the drawing to a manageable size, only pallet groups containing right exterior panels are shown.

In the loading dock area, pallet 7 loaded with work 71 are supported on the bed 60 of the truck 6. The pallet 7 is transferred to the pallet handling device 1 by conveyor 63. A lifting device 10 raises pallet 7 from the level of the truck bed 60, located at the entrance 3. An intermediate transport device 20 transports pallet 7 and the work loaded thereon from the lifting device 10 to a lifting device 30 located at a stock area. The lifting device 30 includes supporting arms 32 with conveying rollers 34 positioned in the stock area. A work loading device 40 removes the exterior panels 71 from pallet 7, which has been previously transported to the stock area, and then loads the work onto a conveyor comprising platform 5 and right circulation rail 4R.

The work loading device 40 is lined up along the length of the plant. Only one device 40 need be provided for all the lifting devices 30A through 30E. Alternatively, five (5) separate work loading devices 40 can be provided at each of the five (5) pallet handling devices 1.

In the embodiment with a single work loading device 40, the work loading device 40 can move along the set of rails 50A between the five (5) work groupings 10A through 30A, 10B through 30B, 10C through 30C, 10D through 30D and 10E through 30E.

Right circulation rail 4R runs along the length of the loading dock 1, and carries the work to right panel unloading position 5R, which is adjacent to the first working position on the welding and assembly line 2. A work unloading device 90 unloads exterior panel 71 at unloading position 5R. It places the work into the first station 2R, next to welding and assembly line 2. It can then return to its original position on the conveyor, since the circulation rail 4R is a closed loop.

The left circulation rail 4L carries the work from the left pallet loading dock are (not shown) to the left panel unloading position 5L, just opposite to the aforesaid right panel unloading position 5R. The work unloading device 90 unloads exterior panel 71 at unloading position 5L. It places the work into the first station 2L, next to welding and assembly line 2. It can then return to its original position, as the left circulation rail 4L is a closed loop.

The transportation flow operation will now be described. First, exterior panels 71 for the various models of cars are manufactured at a pressing (i.e., stamping) plant (not shown). A number of these panels are stacked vertically on the pallet 7, which is then loaded onto the bed 60 of truck 6. Truck 6 is parked alongside the loading dock area adjacent to the pallet handling device 1, which handles the appropriate automotive model.

Next, the pallet containing the exterior panels 71, is taken off the bed 60 of the truck 6, and brought in and temporarily placed in the stock areas by pallet handling device 1. An exterior panel 71 for the appropriate model is removed by the work loading device 40 from the pallet 7 located in the stock area based on a signal from the welding and assembly line 2 indicating which model to select. The panel 71 is loaded onto the platform 5 of the conveyor. The platform 5 carries the panel 71 to the unloading position 5R, adjacent to welding and assembly line 2. At unloading position 5R, work unloading device 90 unloads exterior panel 71 to the first station 2R, which is next to line 2. The empty platform 5 returns by itself to the vicinity of loading dock, where based on another model selection signal, another exterior panel 71 is removed from the pallet 7 in the stock area where that model's work is kept, and the previous operation is repeated.

To keep up with the speed of welding and assembly line 2, a number of platforms 5 can be deployed on circulation rail 4R.

Referring to the operation at the loading dock, a truck 6 is used to transport full pallets to the plant entrance 3. A conveyor 63 runs from side to side on the bed 60 of truck 6. The pallet 7, loaded with panels 71 are moved on conveyor 63 to the pallet handling device 1.

Figure 2:
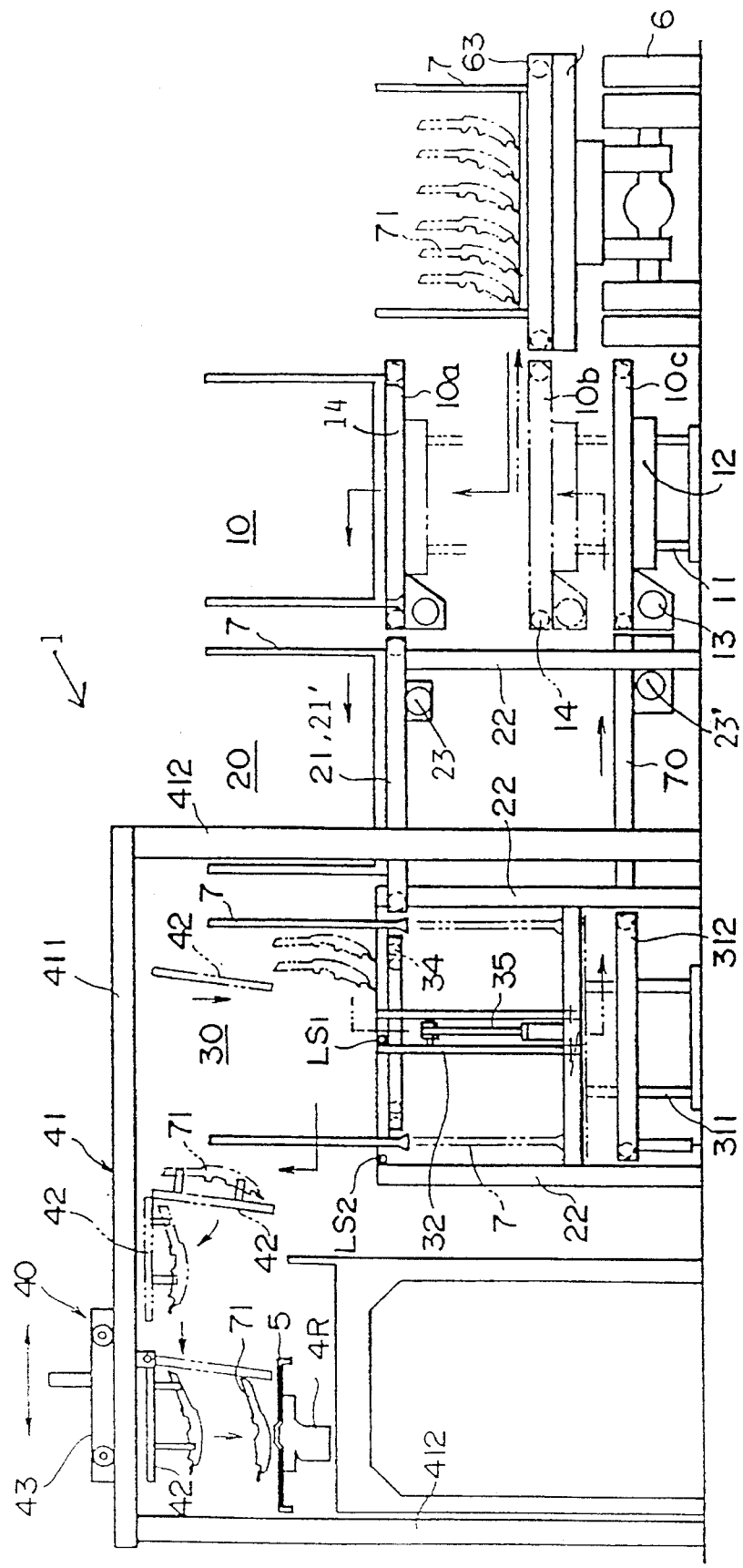
FIG. 2 is a complete side view of a work transport device located next to the truck loading dock.

As shown in FIG. 2, the pallet handling device 1 includes a lifting device 10, which receives pallet 7 transported from truck 6. The lifting device 10 lifts the pallet 7 from a mid-position to a high position along a pallet delivery route, and then transports the pallet 7 to an intermediate transfer device 20, which is connected to and positioned adjacent to the lifting device 10. Another lifting device 30 is connected to and positioned adjacent to the intermediate transfer device 20, and receives pallets 7 from the intermediate transfer device 20.

The lifting device 10 includes an elevator 12, which is raised and lowered by hydraulic cylinders 11. A pair of drive conveyors 14 are provided on top of the elevator 12, which are driven and controlled by motor 13. The conveyors 14 are arranged side-by-side (in the drawing, one behind the other) on elevator 12 in the direction the pallet 7 is being transported. When pallet 7 is conveyed to a specified position in the center of drive conveyors 14, the conveyors 14 are stopped automatically by a limit switch (not pictured) which protrudes from their surface.

The drive conveyors 14 can be lifted to any of three positions, shown by dotted lines in FIG. 2. The drive conveyors 14 are moved by elevator 12 via hydraulic cylinders 11. The three positions will be referred to as the high position 10a, the mid-position 10b and the low position 10c.

The mid-position 10b is adjustable and set so that it is at the same level as conveyor 63 located on the bed 60 of truck 6. Thus, the lifting device 10 can accommodate different height delivery vehicles. This enables pallet 7 to be transferred smoothly between the truck 6 and the lifting device 10.

The high position 10a is set at the same level as drive conveyor 21 on the upper portion of intermediate transfer device 20. This ensures that pallet 7 can be transferred smoothly from lifting device 10 to intermediate transfer device 20.

The low position 10c is set at the level of drive conveyor 70 on the lower portion of intermediate transfer device 20. This guarantees that pallet 7 can be returned easily from intermediate transfer device 20 to lifting device 10.

The intermediate transfer device 20 comprises two pairs of drive conveyors 21, 21' and 70, 70' as mentioned above, located, respectively, on its upper and lower levels. The drive conveyors 21, 21' located on the upper level of the intermediate transport device 20 help move pallet 7 and its load of panels 71 from the lifting device 10 to the intermediate transfer device 20. The drive conveyors 21, 21' are also used as a storage device where the pallet 7 waiting to be transported to the lifting device 30 can be kept temporarily. Specifically, while there is still work 71 on a pallet 7 positioned on the lifting device 30, the drive conveyors 21 provide storage space for the next pallet 7 to be moved onto the lifting device 30.

The drive conveyors 70 located on the lower level of the intermediate transfer device 20 receive the empty pallet 7 from the lifting device 30, which will be discussed below. The drive conveyors 70 serve as collection conveyors for pallets being sent back to the lifting device 10.

The pair of drive conveyors 21, 21' are driven and controlled by motor 23, and the pair of drive conveyors 70, 70' are driven by motor 23'. Each pair of conveyors 21, 21' and 70, 70' are arranged side-by-side (one behind the other in the drawing) in the direction in which the work is transported.

Figure 5:
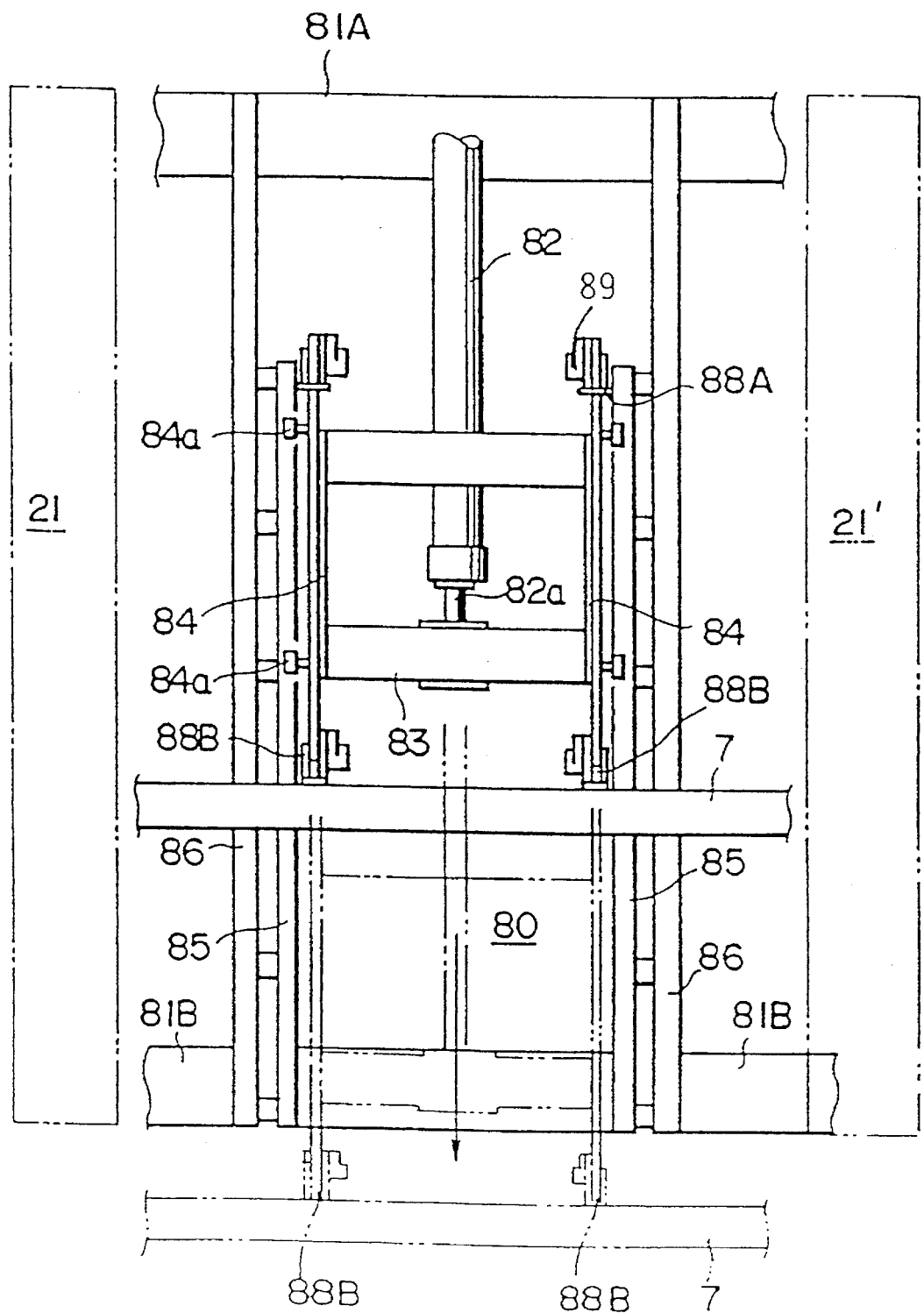
FIG. 5 is a detailed top view illustrating the operation of the pallet pushing device of the intermediate conveyor.
Figure 7:
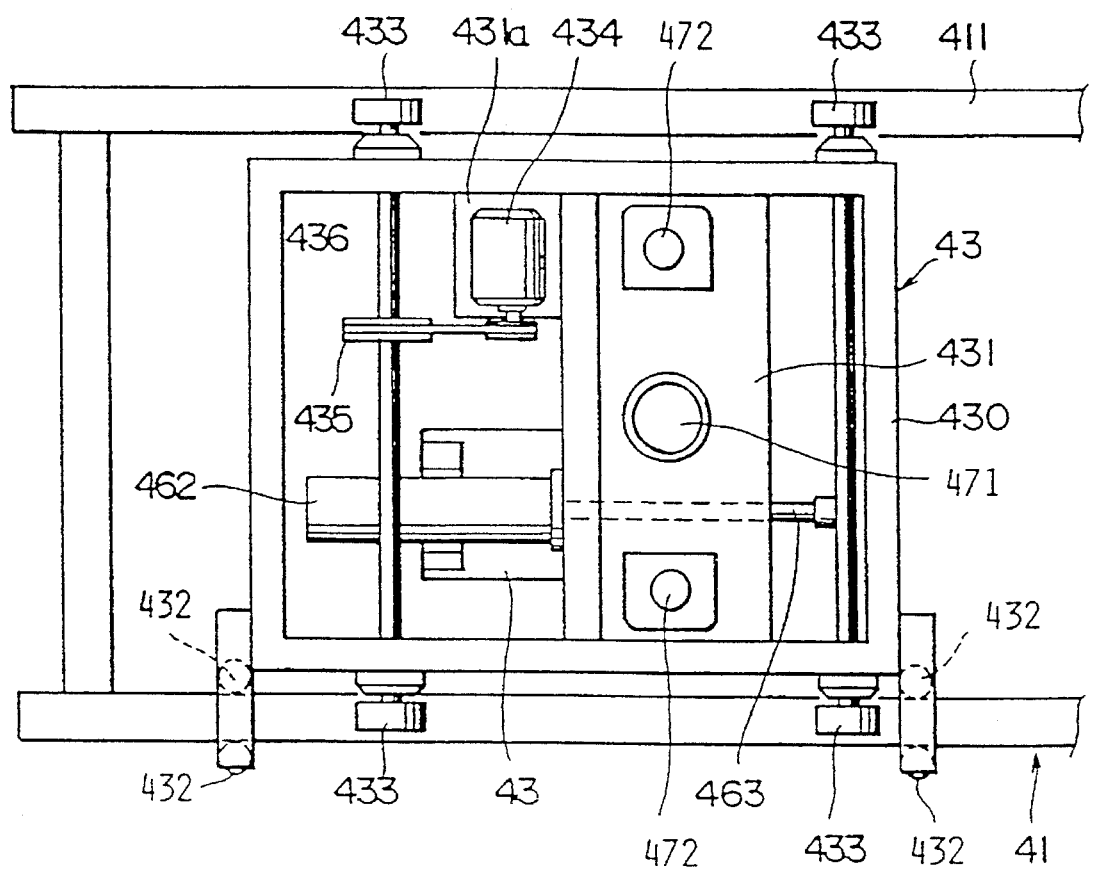
FIG. 7 is a top view of the work loading device which remove work from the work transport device and loads it onto the conveyor.

A pallet pushing device 80 is provided at the intermediate transfer device 20, and located between the drive conveyors 21, 21'. The pallet pushing device 80 is anchored to the center of supports 81A and 81B, which in turn are connected to side frames 81, as shown in FIGS. 5 and 6. The pallet pushing device 80 comprises hydraulic cylinder 82, which expands in the direction in which the work is being transported; a pair of latch supports 84 connected together by connecting support 83, which connecting support 83 is connected to the end of piston rod 82a of the cylinder 82; guide rollers 84a extending from latch supports 84, a pair guide rails 85 accommodating guide rollers 84a which allow the latch supports 84 to travel in the work transfer direction; a pair of support bars 86 fixed between supports 81A and 81B at the front and back of the range of travel with the support bars supporting guide rails 85.

The aforementioned latch supports 84 are slightly shorter than the length of the stroke of cylinder 82 (i.e., ⅔ of the stroke length). The latches 88A and 88B, which can be raised by their own weight, are on the front and rear ends of latch supports 84.

A pair of L-shaped stops 89 are provided on the supporting guide rails 85 for interacting with the latches 88A and 88B to prevent further rotation over their standing position when the cylinder is in a retracted position. The stops 89 prevent the latches 88A and 88B from continuing to rotate when they are in the up position, as shown in FIGS. 6A and 6B, when under load and operating on pallet 7.

Figure 3:
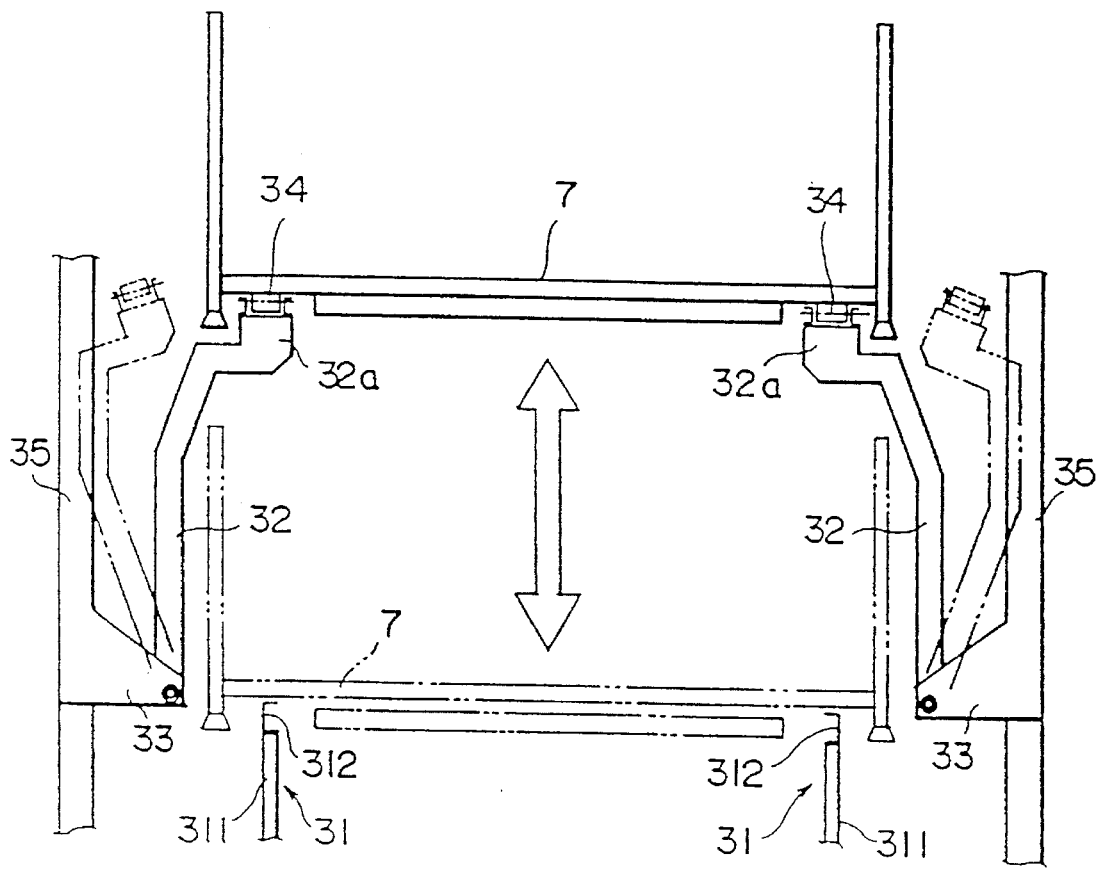
FIG. 3 is a detailed transverse view of the entire structure of the lifting device with guide rollers located in the stock area, as shown in FIG. 2.
Figure 4:
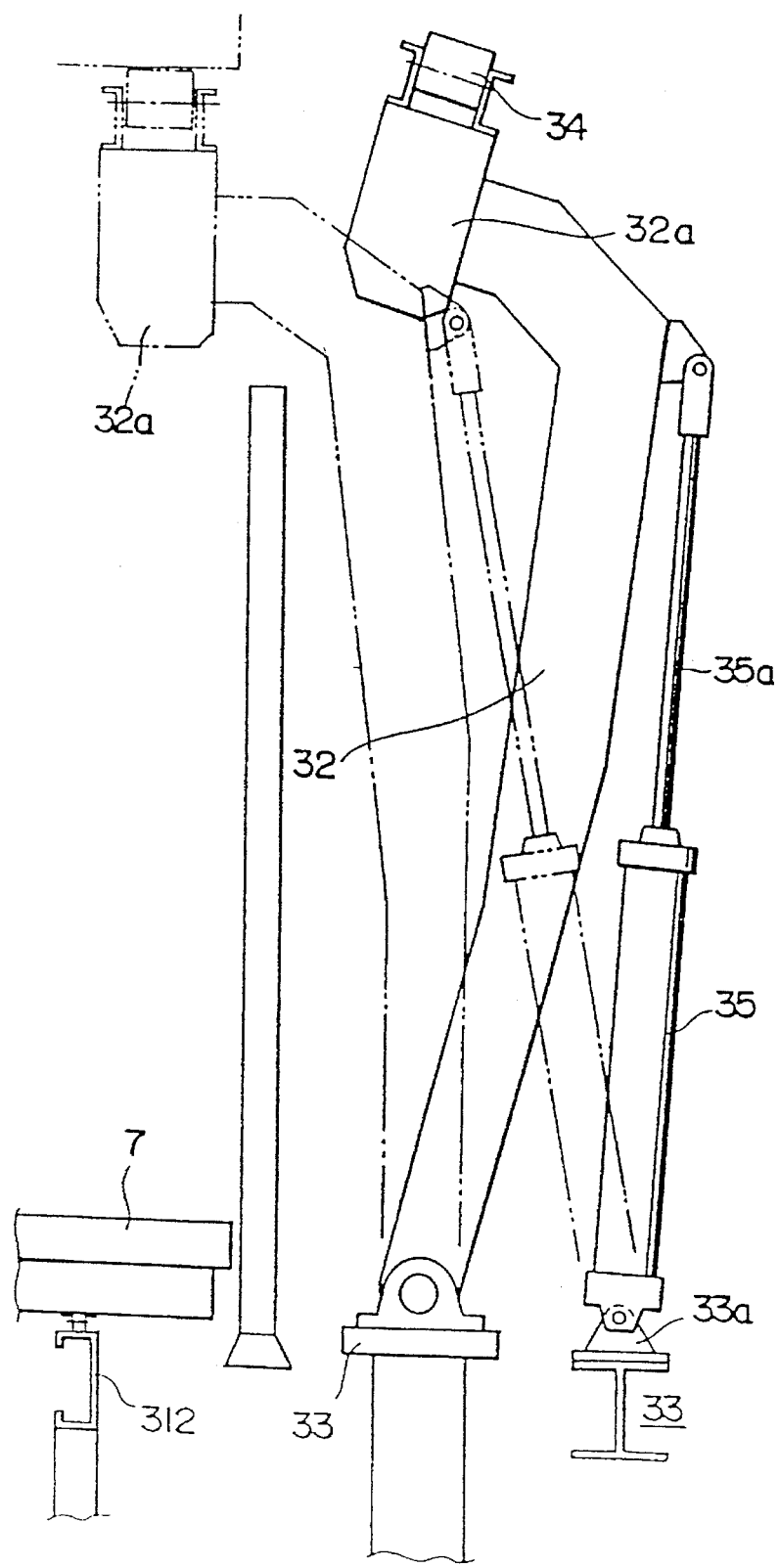
FIG. 4 is an enlarged detailed view of the lifting device, as shown in FIG. 3.

As shown in FIGS. 2, 3 and 4, the lifting device 30 includes a lifting means 31, which comprises hydraulic cylinders 311 and drive conveyor 312. The cylinders 311 raise and lower the drive conveyor 312, which supports pallet 7 from beneath. In this way, the hydraulic cylinders 311 bring the pallet to the lower level. On either side of lifting means 31 are supporting arms 32, which can be withdrawn out of the space in which the lifting means 31 moves downwardly. The supporting arms 32 are pivotally supported at bases 33.

As can be seen in FIGS. 3 and 4, the supporting arms 32 are pivotally connected to base component 33, which allow the supporting arms 32 to assume a vertical position. The supporting arms 32 are bent slightly in the middle so that their top halves incline toward each other. The tops of the supporting arms 32 are bent in towards each other, and are almost horizontal. Conveying rollers 34 to transport pallet 7 are mounted on top of horizontal portions 32a of the supporting arms 32.

The hydraulic cylinders 35 are mounted on the outside of the supporting arms 32. Their lower ends are supported by bases 33a. The end of each extendable rod 35a is connected to an arm, which is attached to the supporting arm 32. When the rod in the hydraulic cylinder 35 contracts, the supporting arm 32 is drawn outward away from the position in which it supports pallet 7. The inner sides of the supports 32a must be placed slightly outside the path of the lifting means 31 so that they do not hinder the movement of the lifting means 31.

A pair of limit switches LS1 and LS2 are mounted on the top of the lifting means 31 and on supports 22, respectively, as shown in FIG. 2. When the pallet pushing device 80 drives pallet 7 as far as it should go, the front of the pallet presses the limit switches LS1 and LS2 to control the drive for pallet pushing device 80.

When all work is removed from pallet 7, the lifting means 31 lowers the pallet 7 to the lower position. The empty pallet is then moved by drive conveyor 312 of the lifting device 30 to the drive conveyor 70 of the intermediate transfer device 20 until it reaches the drive conveyor 14 of the lifting device 10.

The operation of the work loading device 40 will be explained with reference to FIGS. 2, 7, 8 and 9.

The work loading device 40 removes an exterior panel 71 from pallet 7 sitting on drive conveyor 312, which is part of the lifting device 32. It then rotates the exterior panel 71 from a vertical to a horizontal orientation, and loads it onto platform 5 running on circulation rail 4R of the conveyor. The work loading device 40 is movably supported on crane frame 41, which runs between the stock area and the circulation rail 4R of the conveyor.

The work loading device 40 includes two pivoting arms 42, which grasp panel 71. These pivoting arms 42 and pivoting mechanism 44 are mounted from rails 411, which run along the length of the crane frame 41. A car 43 of the work loading device 40 travels along the rails 411.

The crane frame 41 includes horizontal rails 411, which run overhead between lifting device 30 and circulation rail 4R, and vertical supports 412 that support rails 411.

Figure 9:
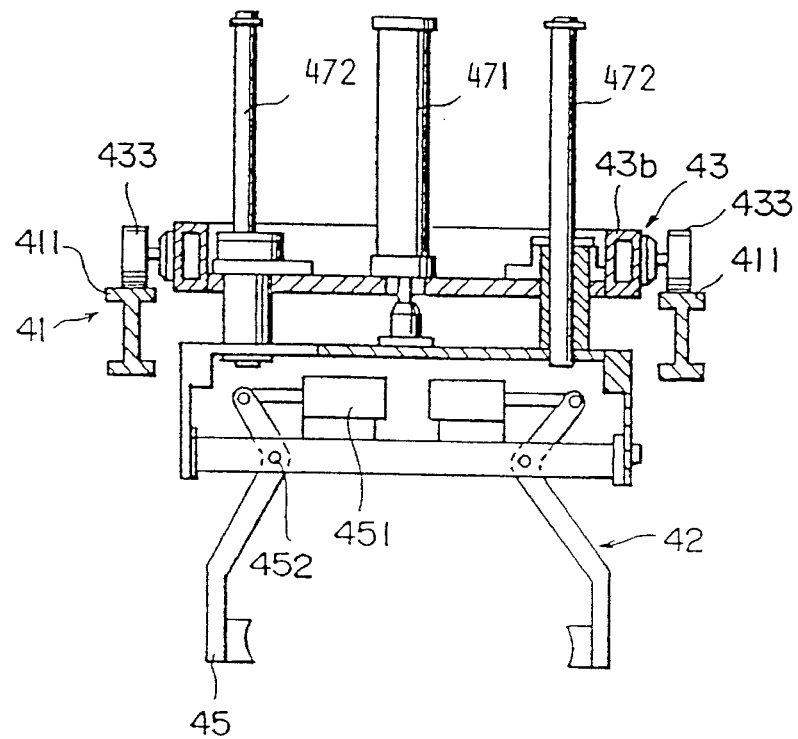
FIG. 9 is a transverse view of the work loading device, as shown in FIG. 7.

The pivoting arms 42 are shown in FIG. 9. Hydraulic cylinders 451 actuate clamps 45 by pivoting arms 42 about fulcrums 452. The clamps 45 are mounted on the ends of the pivoting arms 42, and grab and hold the exterior panel 71.

Figure 8:
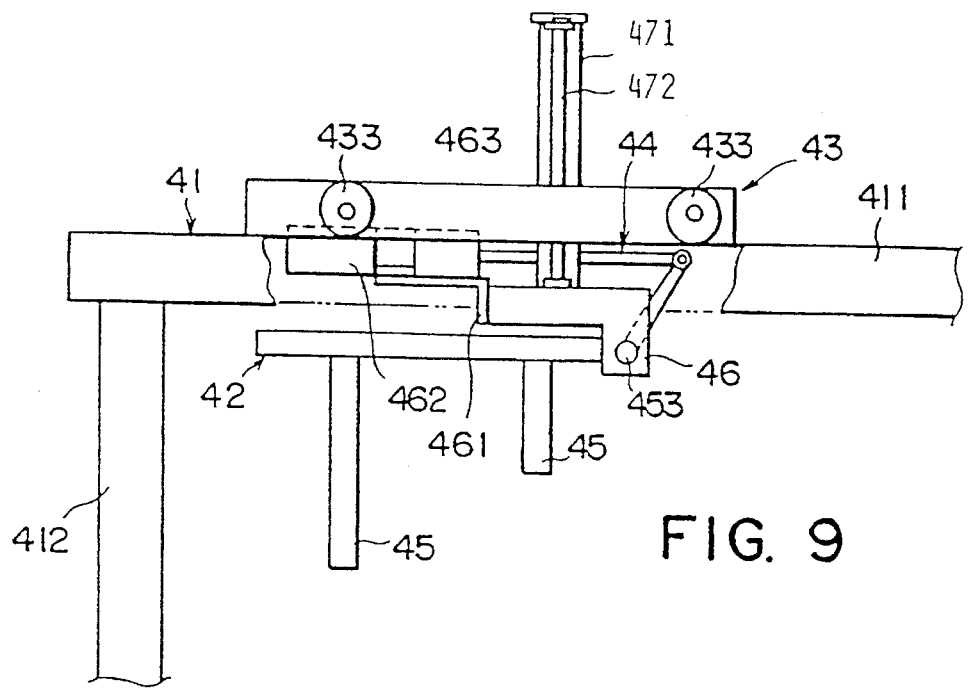
FIG. 8 is a side view of the work loading device, as shown in FIG. 7.

At the base of the pivoting arms 42, as can be seen in FIG. 8, the pivoting arms 42 are pivotally supported by fulcrum shaft 453 to the lower ends of vertical portions of L-shaped lifting member 46. The fulcrum shaft 453 can be made to rotate 90° from a vertical to a horizontal position by the movement of cylinder rod 463 when hydraulic cylinder 462 expands and contracts. The hydraulic cylinder 462 is mounted on the top of brackets 461, which are fastened to the ends of the horizontal portions of the L-shaped lifting member 46.

The L-shaped lifting members 46 are attached to horizontal plate 431, which is mounted on a square frame 430 of car 43 by means of vertical hydraulic cylinder 471 and a pair of guide rods 472. When hydraulic cylinder 471 expands and contracts, the exterior panel 71 which is held by pivoting arms 42 is loaded on platform 5, which runs on the circulation rail 4.

The car 43 has four wheels 433, which are mounted on the left and right sides of the square frame 430. These wheels 433 run on rails 411 of crane frame 41. Two pairs of guide rollers 432 supported at the front and rear of square frame 430, and provided on both sides of one rail 411 control the direction in which the car 43 moves on the rails 411.

A motor 434 is mounted on an extended portion 431a of the horizontal panel 431. The forward and reverse revolution of this motor 434 controls the drive applied to axle 436 driving wheels 433 through sprocket 435. In this way, the movement of car 43 along rails 411 allow the pivoting arms 42 to shuttle between the lifting device 30 and the circulation rail 4R.

The work loading device 40 allows exterior panel 71 to be loaded onto platform 5 on circulation rail 4R. Panel 71 is transported by platform 5 to unloading position 5R adjacent to welding and assembly line 2. A work unloading device 90 transfers the panel to the first station 2R, which is adjacent to welding and assembly line 2.

Figure 10:
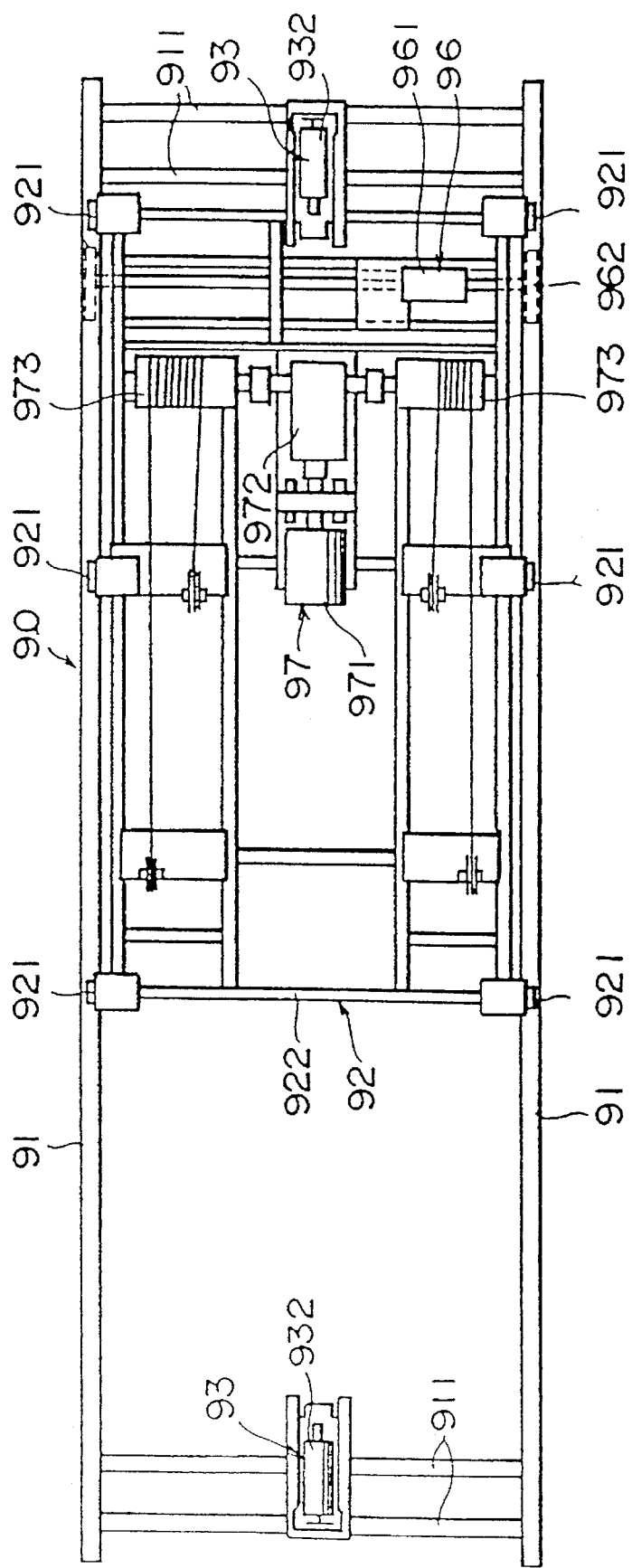
FIG. 10 is a top view of the work unloading device, which moves the work from the conveyor to a station next to the welding and assembly line.
Figure 11:
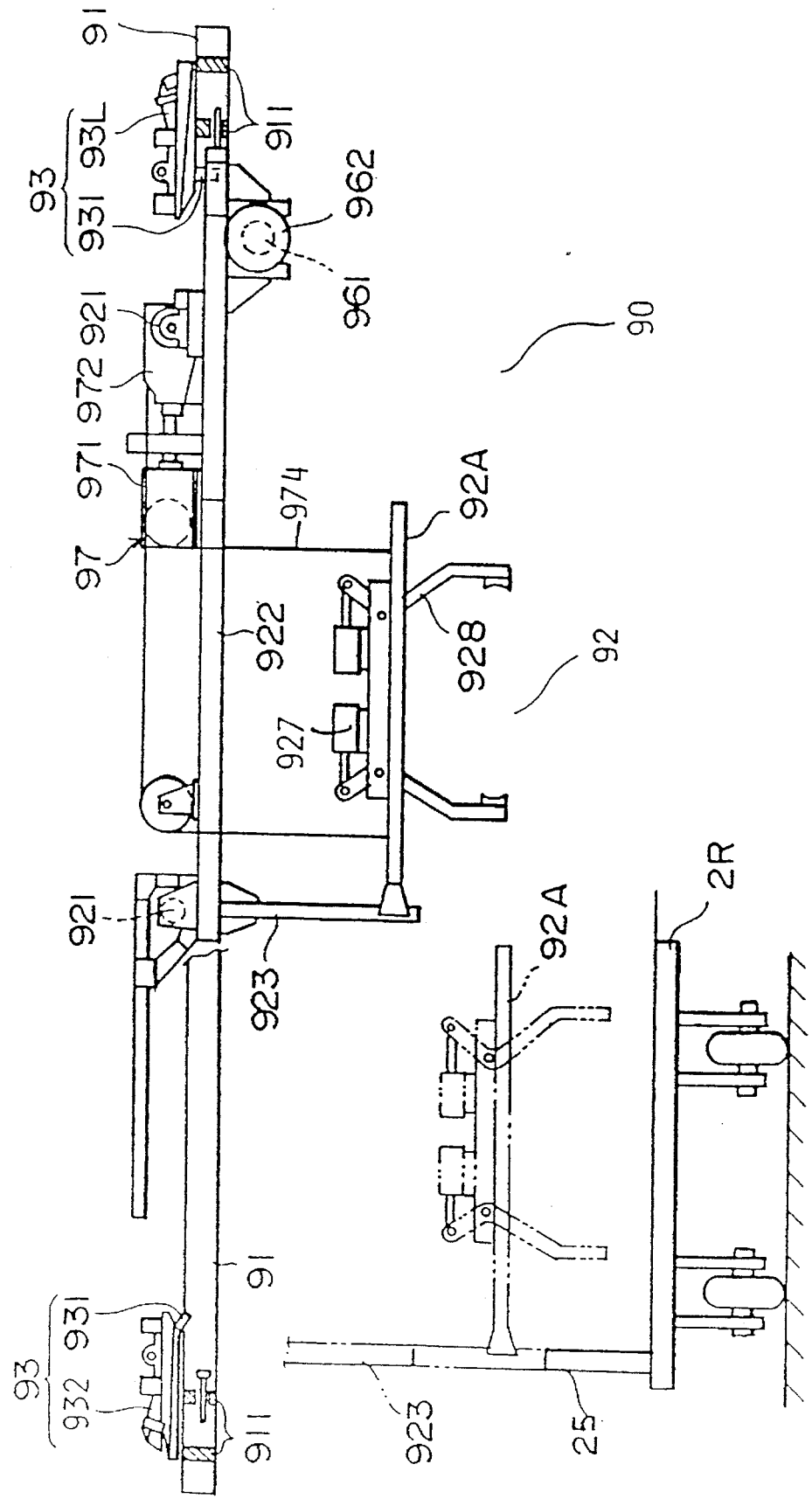
FIG. 11 is a front view of the work unloading device, as shown in FIG. 10.

A detailed explanation of the configuration of work unloading device 90, with reference to FIGS. 10 and 11 will now be described.

The work unloading device 90 has two rails 91, which run between unloading position 5R, next to circulation rail 4R, and station 2R, next to welding and assembly line 2. It also has a traversing device 92, which shuttles on rails 91 carrying exterior panel 71.

One locking mechanism 93 is mounted on each end of the rails 91 to lock the traversing device 92 into position. The locking mechanism 93 has a pawl 931 connected to sleepers 911, a beam supporting rails 91; and a drive cylinder 932 to drive pawl 931. This design enables traversing device 92 to be positioned accurately in either the unloading position or station 2R next to the welding and assembly line.

The traversing device 92 has six rollers 921, which are mounted at its front, middle and rear; a vertical rail 923 extending downward from the center of the front end of main frame 922, which runs on the rails 91; and a frame 92A, to which is mounted pivoting arms 928, opened and closed by hydraulic cylinder 927. The frame 92A is raised and lowered on vertical rail 923. The length of this rail 923 is chosen to match that of guide rail 25, which is mounted vertically in station 2R adjacent to the welding and assembly line.

On main frame 922 are mounted drive mechanism 96, which drives the traversing device 92 along rails 91, and lifting mechanism 97, which raises and lowers frame 92A while it holds exterior panels 71.

The drive mechanism 96 is connected to motor 961. The drive wheels 962 run on rails 91. By controlling the rotation of the drive wheels 962, the main frame 922 can be driven back and forth on rails 91.

The lifting mechanism 97 has a motor 971, which drives winch 973 through reduction gear 972. A wire 974 wound around winch 973 is connected to frame 92A. When motor 971 is driven, winch 973 will wind the wire, thus, raising frame 92A.

An explanation on how the transport device for pallets 7 circulates the pallets is as follows referring to FIG. 2.

First, the lifting device 10 is raised to the mid-position 10b so that conveyor 63 on truck 6, which is delivering the pallet will be level with the drive conveyor on elevator 12 of lifting device 10. The pallet 7 loaded with panels is then moved by conveyor 63 from the bed 60 of the truck 6 to the drive conveyor 14 of the lifting device 10.

Next, the lifting device 10 is raised to the high position so that drive conveyor 14 will be level with conveyor on the upper portion of the intermediate transfer device 20. The conveyor 14 is driven to transport the pallet 7 to the intermediate transfer device 20. Then, the conveyor 21 is driven together with the pallet pushing device 80, and pallet 7 loaded with panels 71 is transported to guide rollers of the lifting device 30.

As these guide rollers 34 lack a drive mechanism, it is difficult to transport pallet 7 accurately to a central position on supporting arms 32 of the lifting device 30 using only the drive power of the drive conveyor of the intermediate transfer device 20.

Therefore, in a preferred embodiment, the pushing device 80 is added to ensure that the pallets are transported accurately to the center position of the lifting device 30.

Specifically, when the rod 82a of the hydraulic cylinder 82 is withdrawn, pallet 7 is transported only by the drive conveyor of the intermediate transfer device 20. In this case, latches 88A and 88B anchored to latch supports 84 are not engaging the pallet 7, but are simple contacting the bottom of pallet 7 in a collapsed condition.

In this situation, when pallet 7 is transported to the specified position on guide rollers 34, latches 88A on the rear ends of the latch supports 84 rotate up under their weight and are released to become vertical to a pallet engaging position, and the hydraulic cylinder 82 is then activated. Then, the latches 88A on the rear ends of the latch supports push pallet 7 onto the supporting rollers 34 of the lifting device 30.

The front of the pallet 7 trips limit switch LS1 on lifter support 32. The limit switch LS1 sends a signal to hydraulic cylinder 82 to move to a retracted position eventually causing the latches 88B on the front ends of latch supports 84 to be rotated to their pallet engaging position. At the same time (when, for example, the release of pressure is detected by a limit switch), hydraulic cylinder 82 in pushing device 80 again expands, and pawls 88B on the front of the supports push pallet 7 onto lifter support 32. When the pallet is transported to the specified position, its front end trips limit switch LS2 on support 22, causing the cylinder to stop expanding and return to its original position.

The panels 71 on pallet 7 have now been transported to the specified position in the stock area. Based on a signal from the welding and assembly line, the pivoting arms 42 on work loading device 40 are brought to a vertical position. The exterior panel 71 is grasped-and held by the two clamps 45, and the pivoting arms 42 are rotated until they are horizontal. Then car 43 moves along rails 411 from lifting device 30 to circulation rail 4R.

When the vertical hydraulic cylinder on car 43 running on circulation rail 4R expands, exterior panel 71 held between pivoting arms 42 and now horizontal, is loaded and secured onto platform 5 of the circulation rail 4. The clamps 45 then open and release their hold on panel 71.

After the expansion and contraction of the vertical hydraulic cylinder 461 causing pivoting arms 42 to go up and down, preparation is begun for the removal of the exterior panel 71 for the next model. The platform 5 returns to a position next to the work loading device 10A–30A, and stands by.

The work loading device 40 loads exterior panel 71 onto platform 5 on circulation rail 4R. The panel is transported by platform 5 to unloading position 8 adjacent to welding and assembly line 2. At position 5R, work unloading device 90 transfers the panel to the first station 2R, next to welding and assembly line 2.

In this transport scheme, the traversing device 92 is shuttled to unloading position 5R and locked in position by locking mechanism 93. Winch 973 lowers frame 92A along vertical rail 923. After exterior panel 71 on platform 5 is grasped, the frame 92A is raised, and the drive mechanism 96 causes the traversing device 92 to shuttle to station 2R near welding and assembly line 2. There it is locked in place by locking mechanism 93.

This results in vertical rail 923 on the side of traversing device 92 to be placed flush against vertical guide rail 25 at station 2R. When the two rails meet, winch 973 lowers traverser body 92A next to guide rail 25. The exterior panel 71 is unloaded onto station 2R, which is at the lower end of guide rail 25.

When exterior panel 71 has been secured onto station 2R by a specified securing device, the frame 92A releases its grip.

The frame 92A is then raised, and drive mechanism 96 causes the traversing device 92 to shuttle back to unloading position 5R, where locking mechanism 93 locks it in place.

After exterior panel 71 has been removed, platform 5 returns along circulation rail 4R to the entry point for panels 71.

The operation described above is repeated until all panels 71 have been removed. With lifting means 31 supporting pallet 7 from below, hydraulic cylinder 35 is actuated, causing supports 32, on which are mounted conveying rollers 34, to be withdrawn outward away from the path on which pallet 7 is raised and lowered. This allows pallet 7 to be lowered.

The lifting means 31 is lowered until it is at the same level as the drive conveyor 70. The drive conveyor 312' loads the empty pallet 7 onto the drive conveyor 70.

The lifting device 10, which sits alongside truck 6, is moved to its low position 10c. It is then at the same level as drive conveyor 70. When the drive conveyor 70 is driven, empty pallet 7 is returned to drive conveyor 14 on lifting device 10. The moment empty pallet 7 is moved onto the lifting device 10 by drive conveyor 70, the drive conveyor 14 on lifter 10 is actuated. It stops when the pallet reaches a specified position on lifting device 10.

The lifting device 10 is then raised to the mid-position 10b, where it is level with the conveyor 63 of the truck 6. The drive conveyor 14 returns empty pallet 7 to the conveyor 63 of the truck 6.

In this embodiment, the effects of the invention described above have been achieved without hindrance. A work transport system is provided which eliminates as much dead space as possible occurring in the vicinity of a production line and achieves an efficient use of space. This system is beneficial from the point of view of both production efficiency and safety.

In this embodiment, pallets 7 are not circulated directly on the production line. This system allows work to be stocked near the entrance of the plant and provides for recirculation of pallets 7.

We claim:

1. A pallet handling device, providing a pallet delivery route and a pallet return route comprising:

a first lifting device located at a pallet receiving end of the pallet handling device, said first lifting device selectively moving upwardly and downwardly between a low position, a mid-position and a high position, pallets being transferred into the pallet delivery route and out of the pallet return route at said mid-position, said first lifting device receiving a pallet loaded with pieces of work at said mid-position along said pallet delivery route;

an intermediate transport device, which has an upper level transport route and a lower level transport route, positioned adjacent said first lifting device and receiving a pallet loaded with pieces of work, transferred onto said intermediate transport device from said first lifting device when said first lifting device is positioned at its high position, at said upper level transport route along said pallet delivery route, said intermediate transport device being capable of temporarily storing a pallet loaded with pieces of work at said upper transfer level;

a second lifting device positioned adjacent to said intermediate transport device, said second lifting device selectively moving upwardly and downwardly between lower and higher positions, said second lifting device receiving the pallet loaded with pieces of work at said higher position along said pallet delivery route from said intermediate transport device; and means for removing pieces of work from said pallet while on said second lifting device at said higher position, said second lifting device lowering the pallet after being emptied of said pieces of work along said pallet return route to said lower position, said intermediate transport device transporting the emptied pallet along the pallet return route to said first lifting device when the first lifting device is at said low position.

2. A work transport system for handling automotive components in a production plant, comprising:

a pallet handling device for transporting pallets loaded with one or more pieces of automotive work from a loading dock area to a stock area, and for returning empty pallets unloaded at said stock area back to said loading dock area;

a plurality of supporting arms provided with conveying rollers for supporting the underside of the pallet in the stock area when received from an intermediate transport device of said pallet handling device, and a lifting device located at said stock area for lowering the empty pallet once all the works have been removed from the pallet, said support arms coupled with a mechanism for withdrawing the support arms from the path of movement of said lifting device;

a work loading device for lifting the automotive works from a pallet transported to said stock area by said pallet handling device;

a conveyor positioned adjacent said work loading device, said conveyor receiving pieces of said automotive work transported from the pallet located at said stock area by said work loading device; and a work unloading device positioned adjacent to a production line in the plant, said work unloading device positioned adjacent a portion of said conveyor, and receiving said work from said conveyor for transporting said work to the production line.

3. The work transport system according to claim 2, wherein said supporting arms are pivotally connected to support structure to allow the arms to be moved out of the path of movement of said lifting device, said mechanism including hydraulic actuators connected to said pivoting arms and the support structure for moving said support arms.

4. A work transport system for handling automotive components in a production plant, comprising:
- a pallet handling device for transporting pallets loaded with one or more pieces of automotive work from a loading dock area to a stock area, and for returning empty pallets unloaded at said stock area back to said loading dock area;
- a work loading device for lifting the automotive works from a pallet transported to said stock area by said pallet handling device;
- a conveyor positioned adjacent said work loading device, said conveyor receiving pieces of said automotive work transported from the pallet located at said stock area by said work loading device; and
- a work unloading device positioned adjacent to a production line in the plant, said work unloading device positioned adjacent a portion of said conveyor, and receiving said work from said conveyor for transporting said work to the production line, said work unloading device includes a car travelling on a set of rails extending from said conveyor to said production line, said car provided with pivoting arms having clamps and a lifting device to raise and lower the pivoting arms with clamps, said work unloading device further including locks provided for the travelling car at a receiving point and dropoff point to insure correct positioning of said car at the end of said rails, and including a vertical guide located at a work station of said production line so that when said car is immobilized by said lock at said dropoff point said car will be flush with said vertical guide, and said pivoting arms with clamps can then be lowered to work loading position of said work station.

* * * * *